United States Patent
Damron

[19]

[11] Patent Number: 5,920,722
[45] Date of Patent: Jul. 6, 1999

[54] SYSTEM AND PROCESS FOR EFFICIENTLY DETERMINING ABSOLUTE MEMORY ADDRESSES FOR AN INTERMEDIATE CODE MODEL

[75] Inventor: Peter C. Damron, Fremont, Calif.

[73] Assignee: Sun Microsystems, Inc., Palo Alto, Calif.

[21] Appl. No.: 08/933,253

[22] Filed: Sep. 23, 1997

[51] Int. Cl.$^6$ .................................................. G06F 9/445
[52] U.S. Cl. ............................................................ 395/706
[58] Field of Search ................................. 395/701–710, 395/712

[56] References Cited

U.S. PATENT DOCUMENTS

| | | | |
|---|---|---|---|
| 4,096,568 | 6/1978 | Bennett et al. ......................... | 364/243 |
| 5,121,498 | 6/1992 | Gilbert et al. ......................... | 395/700 |
| 5,414,821 | 5/1995 | Nguyen et al. ......................... | 395/375 |
| 5,809,306 | 9/1998 | Suzuki et al. ......................... | 395/705 |

*Primary Examiner*—Tariq R. Hafiz
*Assistant Examiner*—Chameli C. Das
*Attorney, Agent, or Firm*—Patrick J. S. Inouye; Kenneth Olsen

[57] ABSTRACT

A system and process for efficiently determining absolute addresses for an intermediate code model of an address space are described. A processor interfaces to a main memory comprising a plurality of addressable locations. Each such addressable location is referenced by an absolute address having a maximum size directly proportional to the total number of the addressable locations in the main memory. The absolute addresses form the address space. Source code is supplied specifying program routines which each include at least one reference to an absolute address within the address space. A translator interfaces with the main memory and the storage device. Object code is generated from the source code program routines. Each such absolute address reference in the source code program routines is instantiated with a code sequence for referencing a subset of the address space. Each such absolute address in the address space subset has a total size smaller than the maximum size and is directly proportional to the total number of the addressable locations in the address space subset. The absolute addresses in the address space subset form the intermediate code model. The translated source code is stored with the instantiated code sequence as object code for execution by the processor.

14 Claims, 3 Drawing Sheets

SYSTEM AND PROCESS FOR EFFICIENTLY DETERMINING ABSOLUTE MEMORY ADDRESSES FOR AN INTERMEDIATE CODE MODEL

FIELD OF THE INVENTION

The present invention relates in general to determining absolute memory addresses and, in particular, to a system and process for efficiently determining absolute memory addresses for an intermediate code model.

BACKGROUND OF THE INVENTION

Conventionally, three forms of memory addresses are used for referencing program instructions and data stored in the memory of a computer: relative, symbolic and absolute. Relative addresses describe memory locations relative to a base or reference memory location. Symbolic addresses are arbitrary names or labels used for mnemonically referencing memory locations. Prior to program loading and execution, symbolic addresses are translated into relative, relocatable memory addresses which are instantiated using a symbol to a base or reference memory location. Absolute addresses are actual physical memory locations hard-coded into the program.

During the translation of source code to object code, the code generator of the compiler (or equivalent translator) outputs relocatable machine code. The code generator inserts a code sequence into the code for generating the absolute address of each relocatable address at runtime. The code sequence can also be expressed in assembly language and manually programmed into assembly language programs.

The particular code sequence used for generating memory addresses is determined by two factors: the architecture of the particular computer upon which the code is to be run and the code model desired for the code. The architecture dictates hardware-based considerations, such as the address space, number of bits per address and the registers available for address formation and calculation. The code model defines the addressability properties given the constrains of the architecture. The two basic classes of code models are absolute and position independent. Absolute code models vary in the number of bits that are settable within each address. Position independent code models employ an offset stored in a register or use some form of indirect addressing.

In general, architectures employing an absolute code model for accessing the full address space require code sequences for providing general addressing. For instance, with a 32-bit architecture, code sequences that can generate any 32-bit absolute address within the full address space are generally used. An example of a 32-bit architecture employing such a linear, 32-bit address space is the SPARC™ chip architecture, version 8, such as described in "The SPARC Architecture Manual, Version 8," chs. 1 and 6 and Apps. J and K, SPARC Int'l, Inc. (1992), the disclosure of which is incorporated herein by reference. SPARC™ is a trademark of SPARC International, Inc., Menlo Park, Calif. Normally, each code sequence can generate any one of the addresses for the 32-bit address space by filling in constants in the relocatable machine code identified by the address symbols. The link-editor fills in these constants after compilation since the values of the constants are unknown beforehand.

Similarly, with a 64-bit architecture, the natural extension of the 32-bit absolute address is the 64-bit absolute address. An example of a 64-bit architecture employing such a linear, 64-bit address space is the SPARC™ chip architecture, version 9 (SPARC V9), such as described in "The SPARC Architecture Manual, Version 9," chs. 1 and 8 and Apps. D and J, SPARC Int'l, Inc. (1994), the disclosure of which is incorporated herein by reference. However, the conventional code sequences used to generate 64-bit absolute addresses are relatively long and slow. For example, with the SPARC V9 chip architecture, the code sequence used to access the full address space requires six instructions. Absent code optimization, this entire six-instruction code sequence must be executed each time an access to memory is issued. Consequently, any decrease in the number of instructions required in the code sequence would normally result in a significant performance increase. Moreover, not every program needs to use full 64-bit absolute addresses and a code model defining an intermediate size between 32 and 64 bits can create a useful subset with increased memory access performance.

Therefore, there is a need for an approach to providing absolute addressing for an intermediate code model as a subset of a larger address space. Such an approach would provide the benefit of faster and smaller code while still allowing absolute addressing of a significantly larger address space than available in an architecture offering a comparatively smaller maximum address space.

There is a further need for an efficient code sequence used for providing absolute addressing into a subset of a full address space whereby the code sequence is faster and smaller than the code sequence used for providing absolute addressing into the full address space.

SUMMARY OF THE INVENTION

The present invention enables the above problems to be substantially overcome by providing a system and process for efficiently determining absolute memory addresses for an intermediate code model.

An embodiment of the present invention is a system and process for efficiently determining absolute addresses for an intermediate code model of an address space. A processor interfaces to a main memory comprising a plurality of addressable locations. Each such addressable location is referenced by an absolute address having a maximum size directly proportional to the total number of the addressable locations in the main memory. The absolute addresses form the address space. Source code is supplied specifying program routines which each include at least one reference to an absolute address within the address space. A translator interfaces with the main memory and the storage device. Object code is generated from the source code program routines. Each such absolute address reference in the source code program routines is instantiated with a code sequence for referencing a subset of the address space. Each such absolute address in the address space subset has a total size smaller then the maximum size and is directly proportional to the total number of the addressable locations in the address space subset. The absolute addresses in the address space subset form the intermediate code model. The translated source code is stored with the instantiated code sequence as object code for execution by the processor.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION

I. System for Efficiently Determining Absolute Memory Addresses

Figure 1:
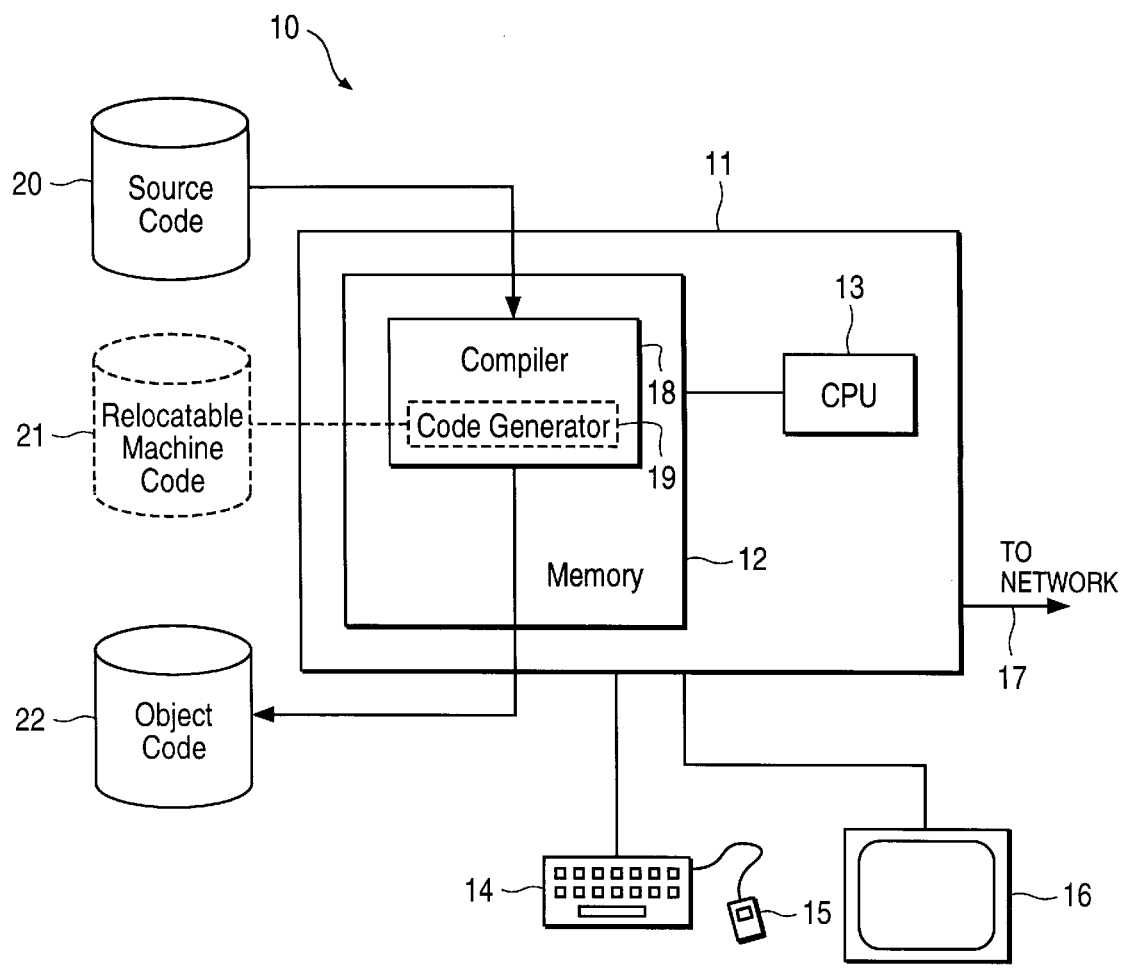
FIG. 1 is a block diagram of a system for efficiently determining absolute memory addresses according to the present invention.

FIG. 1 is a block diagram of a system 10 for efficiently determining absolute memory addresses according to the present invention. The system 10 is a conventional programed digital computer 11, including a central processing unit (CPU) 13, a main memory 12 interconnected with the CPU 13 and user interfacing devices, including input devices, such as a keyboard 14 and mouse 15, and output devices, such as a monitor 16. The system 10 can also include devices for accepting computer-readable storage mediums (not shown) and can be interconnected with a network 17 for exchanging data and control signals transmitted as a computer data signal in a carrier wave. The individual components implementing the system 10 are interconnected over a central system bus (not shown) used for exchanging addresses, data and control signals, although other forms of component interconnections are possible.

Upon boot-up of the system 10, an operating system and support services, such as device drivers and related interfaces, are loaded into the main memory 12 under the control of the CPU 13. Thereafter, application programs, such as a compiler 18, are loaded into the main memory 12 from secondary storage devices (shown as source code 20, relocatable machine code 21 and object code 21) and executed.

The compiler 18 receives a computer program written in source code 20 and translates the source code 20 into machine executable object code 22. During the process of translation, a code generator 19 outputs relocatable machine code 21 into which code sequences for generating memory addresses are inserted, as further described below. Each code sequence includes a symbol which is instantiated at runtime with a reference address value to create an absolute address. Compilers and, more particularly, code generators, are described in A. V. Aho et al., "Compilers Principles, Techniques, and Tools," pp. 513–584, Addison-Wesley (1986), the disclosure of which is incorporated herein by reference.

In the described embodiment, the system 10 is a Sun Ultra™ 1 workstation computer running Solaris™, a version of the UNIX® operating system and utilizing a 64-bit UltraSPARC™ processor compliant with the SPARC V9 instruction set, as generally described in the "The SPARC Architecture Manual, Version 9," cited hereinabove and "UltraSPARC User's Manual," Sun Microsystems Press (January 1997), the disclosures of which are incorporated herein by reference. However, use of the processes described and suggested herein are not limited to this particular computer configuration which is merely presented as an illustrative system upon which the invention can operate. Ultra™ and Solaris™ are trademarks of Sun Microsystems, Inc., Mountain View, Calif. UltraSPARC™ is a trademark of SPARC International, Inc., Menlo Park, Calif. UNIX® is a registered trademark of The Santa Cruz Operation, Santa Cruz, Calif. The structure of the main memory 12 will now be described.

Figure 2:
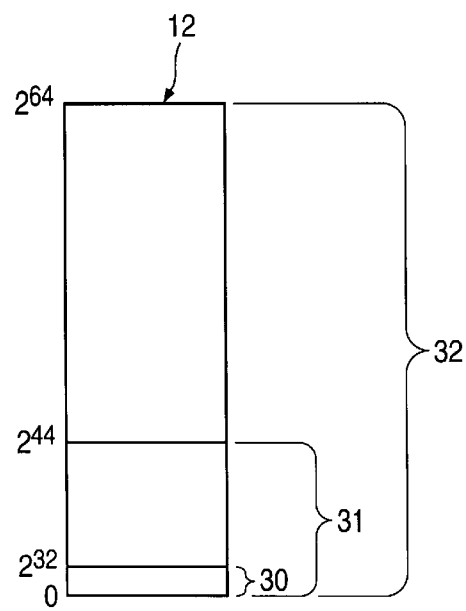
FIG. 2 is a block diagram of the address space of the main memory of the system of FIG. 1.

FIG. 2 is a block diagram of the address space of the main memory 12 of the system 10 of FIG. 1. While not to scale, the block diagram illustrates the relative address sizes of a 32-bit address space 30, 44-bit address space 31 and 64-bit address space 32. Each of the address spaces respectively have $2^{32}$, $2^{44}$ and $2^{64}$ memory locations. The 44-bit address space 31 provides a substantially larger address space (approximately 17 terabytes) than available with the 32-bit address space 30 (approximately 4 gigabytes) and forms a useful memory subset of the full 64-bit address space 32.

Figure 3A:
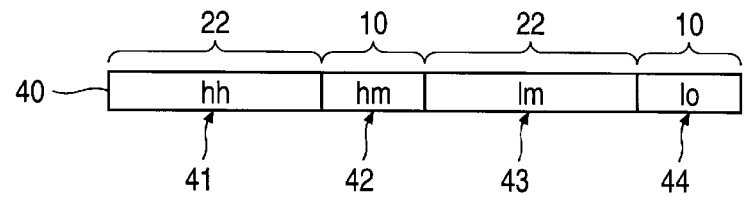
FIG. 3A is a block diagram of an absolute address for referencing a location in the main memory of the system of FIG. 1.
Figure 3B:
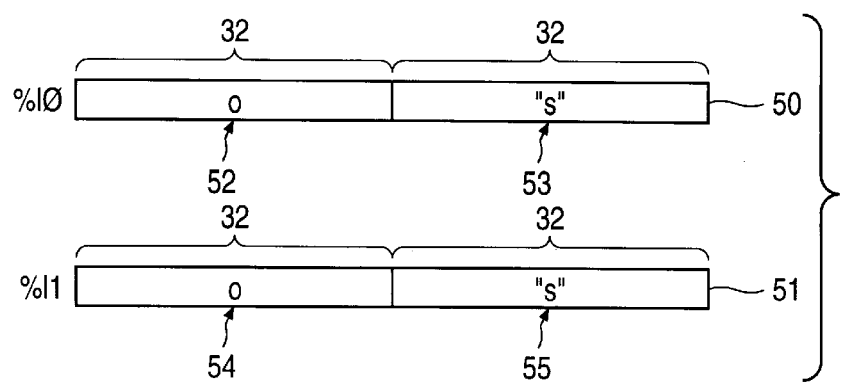
FIG. 3B is a block diagram of a pair of registers for storing a pair of 32-bit segments comprising the absolute address of FIG. 3A.

FIG. 3A is a block diagram of an absolute address 40 for referencing a location in the main memory 12 of the system 10 of FIG. 1. FIG. 3B is a block diagram of a pair of registers 50, 51 for storing a pair of 32-bit segments comprising the absolute address of FIG. 3A. The processor architecture of the described embodiment only supports address register loads of 22 bits and 10 bits. Consequently, a six instruction code sequence, such as shown below in Example 1, is required to form the 64-bit absolute address 40.

Example 1. 64-bit Code Sequence.

| | | |
|---|---|---|
| sethi | % hh(s), % 10 | Form upper 32-bit segment |
| or | % 10, % hm(s), % 10 | of 64-bit absolute address |
| sethi | % lm(s), % 11 | Form lower 32-bit segment |
| or | % 11, % lo(s), % 11 | of 64-bit absolute address |
| sllx | % 10, 32, % 10 | Combine upper and lower |
| or | % 10, % ll(s), % 10 | segments into full address |

The code sequence consists of first forming the upper 32-bit segment of the 64-bit absolute address 40 as a 22-bit segment hh 41 and 10-bit segment hm 42 which are stored into the lower 32 bits 53 of a 64-bit register %10 50. The remaining upper 32 bits 52 of register %10 50 are zero padded. Next, the code sequence forms the lower 32-bit segment of the 64-bit absolute address 40 as a 22-bit segment lm 43 and 10-bit segment hO 44 which are stored into the lower 32 bits 55 of a 64-bit register %11 51. The remaining upper 32 bits 54 of register %11 51 are zero padded. Finally, the code sequence combines the upper and lower 32-bit segments 52, 55 by first shifting the upper 32-bit segment stored in register %10 50 to the left by 32 bits and logically ORing registers %10 50 and %11 51. The resulting 64-bit absolute address 40 is stored in register %10 50. As shown in Example 1, the symbol s is instantiated at runtime to a reference memory location to yield the 64-bit absolute address 40. The sethi, or and sllx instructions are further described in "The SPARC Architecture Manual, Version 9" pp. 131–242, cited hereinabove, which is incorporated herein by reference.

II. Process for Efficiently Determining Absolute Memory Addresses

Figure 4:
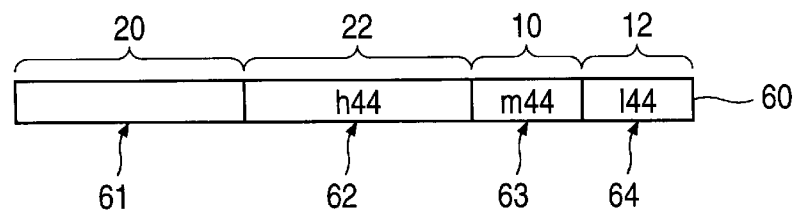
FIG. 4 is a block diagram of an absolute address for referencing a location in a subset of the main memory of the system of FIG. 1 according to the present invention.

FIG. 4 is a block diagram of an absolute address 60 for referencing a location in a subset of the main memory 12 of the system 10 of FIG. 1 according to the present invention. The subset comprises the 44-bit address space 31 (shown in FIG. 2), although comparable address spaces can be suggested by extrapolating the techniques taught and suggested herein. The 44-bit address space 31 forms an intermediate code model for providing a substantially larger address space which can be accessed using a smaller and faster code sequence as described below.

Figure 5:
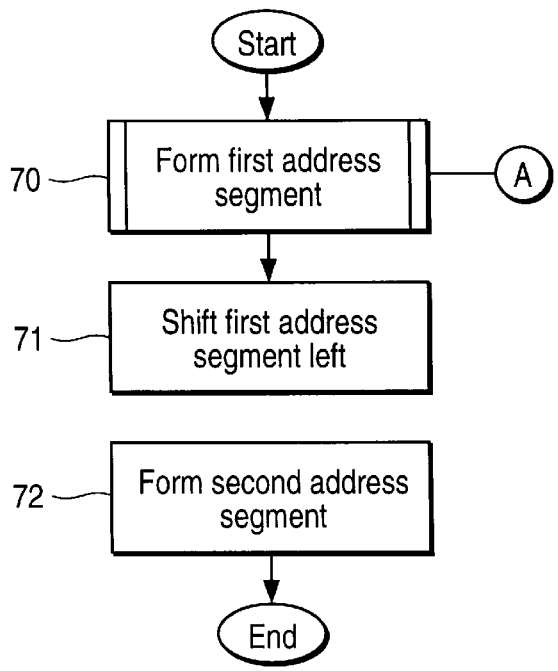
FIG. 5 is a flow diagram of a process for efficiently determining absolute memory addresses according to the present invention.

FIG. 5 is a flow diagram of a process for efficiently determining the 44-bit absolute memory address 60 according to the present invention. The process is illustrated and described as a series of process steps. As would be clear to one skilled in the art, the process steps can be embodied as code for a computer program for operation on a conventional programmed digital computer, such as the system 10 of FIG. 1. An example of such a computer program is the code sequence shown below in Example 2 which can be inserted into relocatable machine code 21 by the code generator 19 of a compiler 18 (all shown in FIG. 1) or manually programmed into the computer program as assembly language code. Finally, the program code can be embodied as a computer program on a computer-readable storage medium or as a computer data signal in a carrier wave transmitted over network 17.

| Example 2. 44-bit Code Sequence. | | |
| --- | --- | --- |
| sethi | % h44(s), % 10 | Form upper 32-bit segment |
| or | % 10, % m44(s), %10 | of 44-bit absolute address |
| sllx | % 10, 12, % 10 | Combine upper and lower |
| or | % 10, % l44(s), % 10 | segments into full address |

The process first forms a 32-bit segment of the 44-bit absolute address 60 as a 22-bit segment h44 62 and 10-bit segment m44 63 which are stored into the lower 32 bits 53 of a 64-bit register %10 50 (shown in FIG. 3B) (block 70), as further described below with reference to FIG. 6. The remaining upper 32 bits 52 of register %10 50 are zero padded. Next, the 32-bit segment is shifted 12 bits to the left (block 71). Finally, the remainder of the 44-bit absolute address 60 is formed by filling in a 12-bit segment l44 64 into the lower 12 bits of the 64-bit register %10 50 (block 72). The resulting 44-bit absolute address 60 is stored in register %10 50. As shown in Example 2, the symbol s is instantiated at runtime to a reference memory location to yield the 44-bit absolute address 60.

Figure 6:
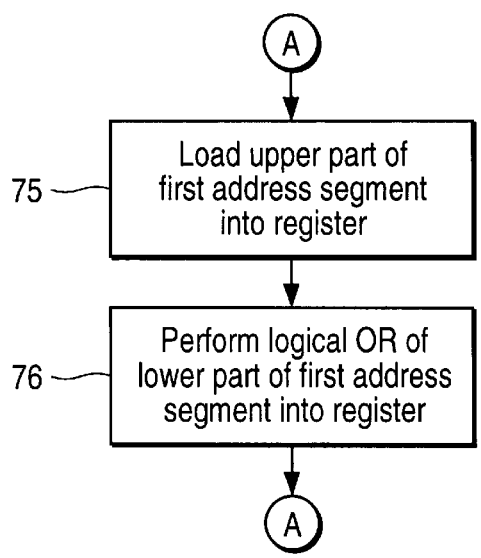
FIG. 6 is a flow diagram of a routine for forming a first address segment used by the process of FIG. 5.

FIG. 6 is a flow diagram of the routine for forming a first address segment (block 70) used by the process of FIG. 5. The routine first loads the 22-bit segment h44 62 of the 44-bit absolute address 60 into the 64-bit register %10 50 (block 75). Next, the routine performs a logical OR of the 10-bit segment m44 63 into the lower 10 bits of a 64-bit register %10 50 (block 76). Other techniques for forming the upper 32-bits of the 44-bit absolute address 60 are possible.

The process can also be expressed symbolically as a code sequence for implementation in a computer program consisting of the following instructions:

| | | |
| --- | --- | --- |
| sethi | X, % 10 | |
| or | % 10, Y, % 10 | |
| sllx | % 10, K, % 10 | |
| or | % 10, Z, % 10 | | where %10 is a register and X, Y, K and Z are variables having the following properties. For instance for K==12, any 44-bit constant can be generated whereby:

K=12;
X=N>>22;
Y=(N>>12) & 0x3ff;
Z=N & 0xfff;

The present invention provides a 44-bit intermediate code model for use in a 64-bit address space, such as available with a SPARC V9 compliant architecture, although it is readily extensible to other architectures employing 128-bit and larger address spaces. Unlike the code sequence required for accessing the full 64-bit address space (shown in Example 1), the described embodiment provides a code sequence requiring only four instructions (shown in Example 2). Thus, it presents a fast, compact technique for accessing the 44-bit address space with an execution time between that required to access a 32-bit address space and a 64-bit address space for an arbitrary 64-bit constant, yet providing a substantially larger address space than a 32-bit address space. However, on a computer utilizing an UltraSPARC™ processor, the six instruction code sequence of Example 1 and the four instruction code sequence of Example 2 both require four machine cycles to complete, although the size of the resultant object code is still smaller. Moreover, on a computer utilizing a SuperSPARC™ processor with a cascaded ALU, the four instruction code sequence of Example 2 requires two machine cycles to complete, thereby drastically improving execution speed. SuperSPARC™ is a trademark of SPARC International, Inc., Menlo Park, Calif.

While the invention has been particularly shown and described with reference to embodiments thereof, those skilled in the art will understand that the foregoing and other changes in form and detail may be made therein without departing from the spirit and scope of the present invention.

I claim:

1. A system for efficiently determining absolute addresses for an intermediate code model of an address space, the system comprising:

a processor interfacing to a main memory comprising a plurality of addressable locations, each such addressable location being referenced by an absolute address having a maximum size directly proportional to the total number of the addressable locations in the main memory, the absolute addresses forming the address space;

a source code supply specifying program routines which each include at least one reference to an absolute address within the address space;

a translator interfacing with the main memory and the storage device for generating object code from the source code program routines and instantiating each such absolute address reference in the source code program routines with a code sequence for referencing a subset of the address space, each such absolute address in the address space subset having a total size smaller than the maximum size and being directly proportional to the total number of the addressable locations in the address space subset, the absolute addresses in the address space subset forming the intermediate code model; and an object code supply storing the translated source code with the instantiated code sequence as object code for execution by the processor.

2. A system according to claim 1, wherein the translator comprises a compiler, the system further comprising:

a code generator within the compiler for instantiating each such absolute address reference in the source code program routines and generating relocatable machine code including the instantiated code sequence; and a relocatable machine code supply storing the translated source code with the instantiated code sequence.

3. A system according to claim 1, wherein the processor comprises a 64-bit and further comprises:

a first register loading a first address segment having a size smaller than the total size and comprising a first portion of one such absolute address for the address space subset; and a second register loading a second address segment having a size small than the total size and comprising a second portion of the one such absolute address for the address space subset, the processor combining the first address segment and the second address segment into the one such absolute address.

4. A system according to claim 3, wherein the total size comprises 44 bits, the first segment comprises a first half comprising 22 bits and a second half comprising 10 bits and the second segment comprises 12 bits, the first register loading the 22-bit first half and the 10-bit second half of the first segment, the second register loading the 12-bit second segment, and the processor shifting the loaded first segment in the first register left 12 bits and loading the 12-bit second segment into the first register to form the one such absolute address.

5. A process for efficiently determining absolute addresses for an intermediate code model of an address space, comprising the steps of:

interfacing a processor to a main memory comprising a plurality of addressable locations;

referencing each such addressable location by an absolute address having a maximum size directly proportional to the total number of the addressable locations in the main memory, the absolute addresses forming the address space;

supplying source code specifying program routines which each include at least one reference to an absolute address within the address space;

interfacing a translator with the main memory and the storage device;

generating object code from the source code program routines;

instantiating each such absolute address reference in the source code program routines with a code sequence for referencing a subset of the address space, each such absolute address in the address space subset having a total size smaller than the maximum size and being directly proportional to the total number of the addressable locations in the address space subset, the absolute addresses in the address space subset forming the intermediate code model; and storing the translated source code with the instantiated code sequence as object code for execution by the processor.

6. A process according to claim 5, wherein the translator comprises a compiler, further comprising the steps of:

instantiating each such absolute address reference in the source code program routines using a code generator within the compiler;

generating relocatable machine code including the instantiated code sequence; and storing the translated source code with the instantiated code sequence.

7. A process according to claim 5, wherein the processor comprises a 64-bit, further comprising the steps of:

loading a first address segment having a size smaller than the total size and comprising a first portion of one such absolute address for the address space subset into a first register; and loading a second address segment having a size small than the total size and comprising a second portion of the one such absolute address for the address space subset into a second register; and combining the first address segment and the second address segment into the one such absolute address with the processor.

8. A process according to claim 7, wherein the total size comprises 44 bits, the first segment comprises a first half comprising 22 bits and a second half comprising 10 bits and the second segment comprises 12 bits, further comprising the steps of:

loading the 22-bit first half and the 10-bit second half of the first segment into the first register;

loading the 12-bit second segment into the second register; and shifting the loaded first segment in the first register left 12 bits and loading the 12-bit second segment into the first register with the processor to form the one such absolute address.

9. A process according to claim 5, wherein the code sequence comprises SPARC V9 instructions comprising:

| | |
|---|---|
| sethi | % h44(s), % l0 |
| or | % l0, % m44(s), % l0 |
| sllx | % l0, 12, % l0 |
| or | % l0, % l44(s), % l0 | whereby sethi, or and sllx comprise SPARC V9 instructions, %h44, %m44 and %l44 represent segment constants, %l0 comprises a register in the processor and s comprises a symbol for instantiation at runtime.

10. A computer-readable storage medium embodying computer code for efficiently determining absolute addresses for an intermediate code model of an address space, the storage medium comprising:

code for interfacing a processor to a main memory comprising a plurality of addressable locations;

code for referencing each such addressable location by an absolute address having a maximum size directly proportional to the total number of the addressable locations in the main memory, the absolute addresses forming the address space;

code for supplying source code specifying program routines which each include at least one reference to an absolute address within the address space;

code for interfacing a translator with the main memory and the storage device;

code for generating object code from the source code program routines;

code for instantiating each such absolute address reference in the source code program routines with a code sequence for referencing a subset of the address space, each such absolute address in the address space subset having a total size smaller than the maximum size and being directly proportional to the total number of the addressable locations in the address space subset, the absolute addresses in the address space subset forming the intermediate code model; and code for storing the translated source code with the instantiated code sequence as object code for execution by the processor.

11. A storage medium according to claim 10, wherein the translator comprises a compiler, further comprising:
- code for instantiating each such absolute address reference in the source code program routines using a code generator within the compiler;
- code for generating relocatable machine code including the instantiated code sequence; and
- code for storing the translated source code with the instantiated code sequence.

12. A storage medium according to claim 10, wherein the processor comprises a 64-bit, further comprising:
- code for loading a first address segment having a size smaller than the total size and comprising a first portion of one such absolute address for the address space subset into a first register; and
- code for loading a second address segment having a size small than the total size and comprising a second portion of the one such absolute address for the address space subset into a second register; and
- code for combining the first address segment and the second address segment into the one such absolute address with the processor.

13. A storage medium according to claim 12, wherein the total size comprises 44 bits, the first segment comprises a first half comprising 22 bits and a second half comprising 10 bits and the second segment comprises 12 bits, further comprising:
- code for loading the 22-bit first half and the 10-bit second half of the first segment into the first register;
- code for loading the 12-bit second segment into the second register; and
- code for shifting the loaded first segment in the first register left 12 bits and loading the 12-bit second segment into the first register with the processor to form the one such absolute address.

14. A storage medium according to claim 10, wherein the code sequence comprises SPARC V9 instructions comprising:

| | |
|---|---|
| sethi | % h44(s), % l0 |
| or | % l0, % m44(s), % l0 |
| sllx | % l0, 12, % l0 |
| or | % l0, % l44(s), % l0 | whereby sethi, or and sllx comprise SPARC V9 instructions, %h44, %m44 and %l44 represent segment constants, %l0 comprises a register in the processor and s comprises a symbol for instantiation at runtime.

* * * * *

UNITED STATES PATENT AND TRADEMARK OFFICE
CERTIFICATE OF CORRECTION

PATENT NO. : 5,920,722
DATED : July 6, 1999
INVENTOR(S) : Damron

It is certified that error appears in the above-identified patent and that said Letters Patent is hereby corrected as shown below:

Column 7,
Line 51, please delete "subset forming" and insert -- subset, the absolute addresses in the address space subset forming --.

Signed and Sealed this

Twenty-sixth Day of October, 2004

JON W. DUDAS
*Director of the United States Patent and Trademark Office*